United States Patent Office 3,081,869
Patented Mar. 19, 1963

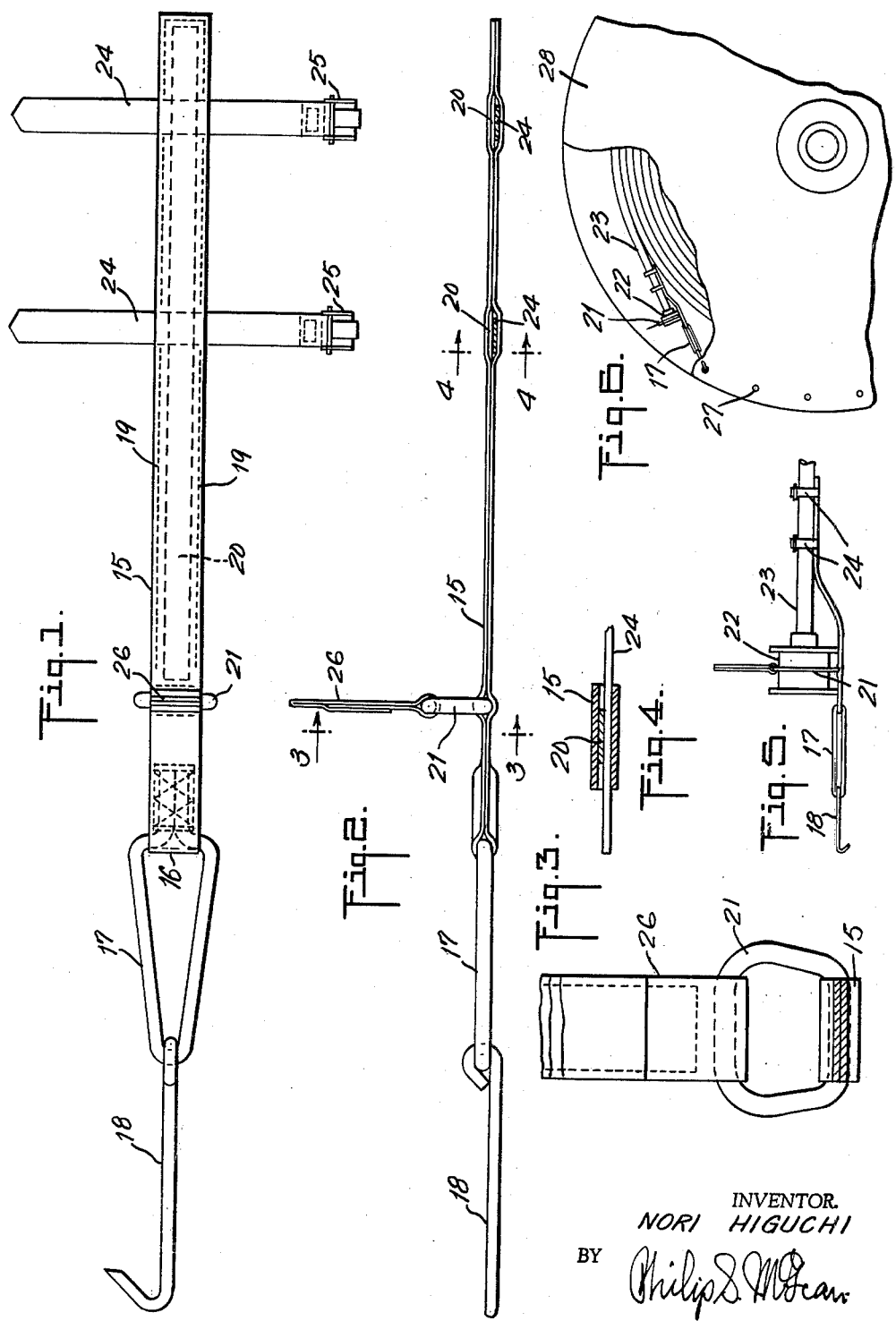

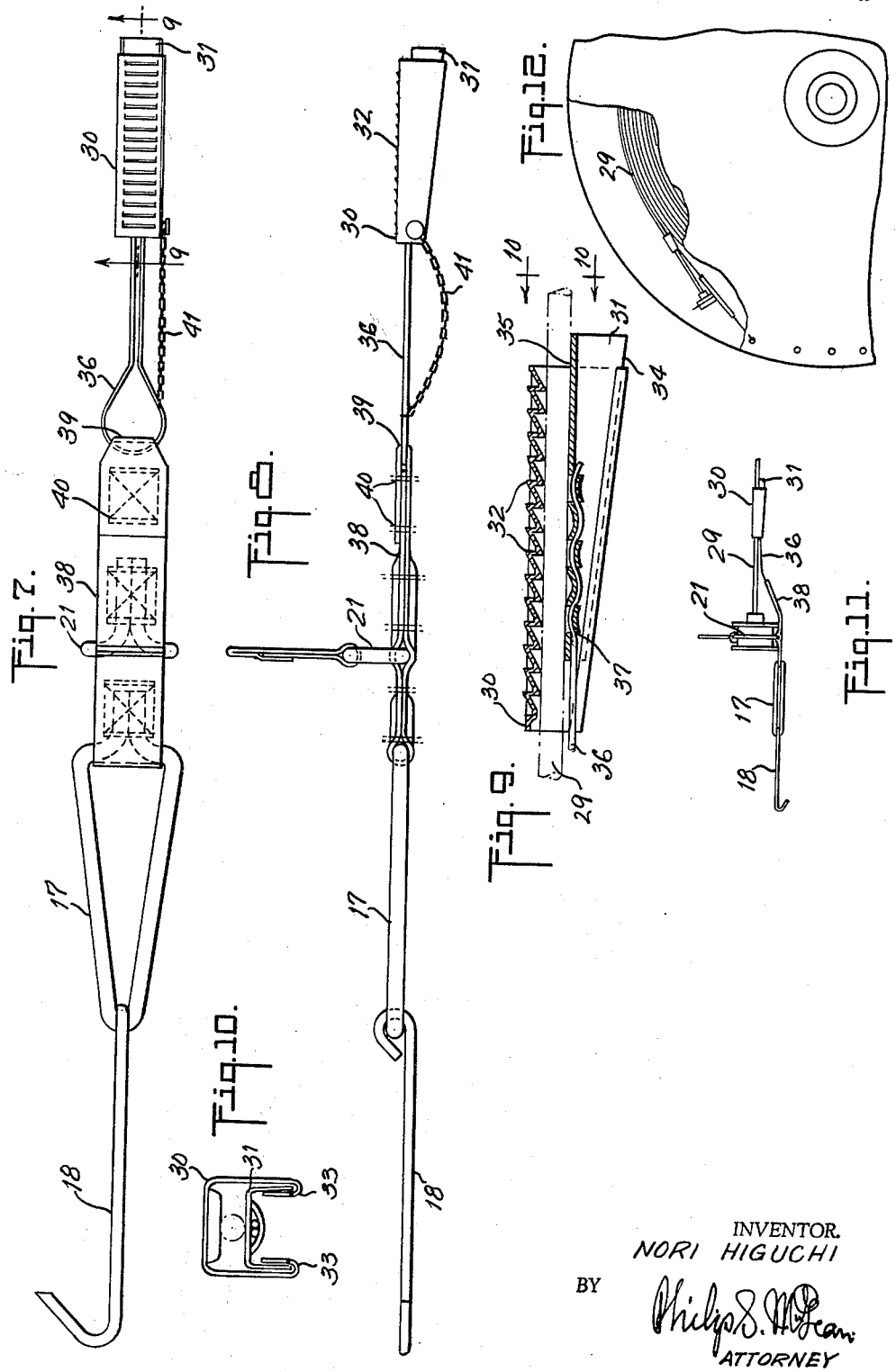

3,081,869
END FASTENINGS FOR CABLE ON LARGE STOWAGE DRUMS
Nori Higuchi, College Point, N.Y., assignor to Davis Aircraft Products Inc., New York, N.Y., a corporation of New York
Filed May 11, 1962, Ser. No. 194,130
3 Claims. (Cl. 206—55)

The invention herein disclosed is a fastening for securing the ends of cable on large size cable drums.

Objects of the invention are to provide a fastening which can be quickly secured to the end of cable on a drum and then be quickly and securely fastened to the drum with assurance that the cable will be securely held on the drum in the subsequent stowage and handling of the drum.

Special objects of the invention are to provide a cable end fastening, flexible in character to suit the bending and adjusting movements of the cable as it is wound on the drum and which will be readily adjustable to fit the cable in place and to hold firmly under tension so that it cannot work loose.

Further objects of the invention are to provide a cable end tiedown having the desirable characteristics mentioned, which will be of relatively simple, inexpensive mechanical structure.

The objects mentioned and other desirable objects are attained by novel features of construction, combinations and relations of parts described in the following specification and defined in the claims.

The drawings accompanying and forming part of the specification illustrate two of the present commercial embodiments of the invention.

Structure may be modified however as regards the immediate illustration, all within the true intent and scope of the invention as hereinafter defined and claimed.

FIG. 1 is a plan view of one of the fasteners designed for holding heavy cable.

FIG. 2 is an edge view of the same with parts appearing in section.

FIG. 3 is an enlarged broken sectional detail as on line 3—3 of FIG. 2.

FIG. 4 is a broken cross sectional detail on line 4—4 of FIG. 2.

FIG. 5 is a broken side elevation of the fastener as applied to the end of a cable.

FIG. 6 is a broken side elevation of the fastener on the cable and secured to one of the heads or flanges of a cable supporting and stowage drum.

FIGS. 7 and 8 are plan and side elevational views respectively of a fastener for lesser diameter cable.

FIG. 9 is an enlarged longitudinal sectional view of the cable clamp used in this form of the invention. This view being taken as on line 9—9 of FIG. 7.

FIG. 10 is a cross sectional view of the clamp as on line 10—10 of FIG. 9.

FIGS. 11 and 12 are broken side elevations of the clamp as applied to the end of the cable and in final position holding the cable on the drum.

The first form of the invention, for large size heavy cable, is made up of a length of strong webbing 15, doubled at 16 about a loop of heavy elastic cord 17 carrying an anchor hook 18 and secured together by stitching 19 or other means about a flexible stiffening strap 20 of steel or the like.

A transversely disposed loop of elastic cord 21 is secured between the layers of webbing in back of the end loop 17 for embracing a connector 22, FIG. 5, such as usually present on a cable 23 and transverse straps 24 are secured between the layers of webbing, underlying the intermediate metal strap 20 for embracing the body of the cable adjacent the end connector, as shown in FIGS. 5 and 6.

The cable encircling straps 24 may be of webbing and are shown equipped with quick connectible and releasable end clamps 25 enabling these straps to be quickly pulled tight and securely gripped about the cable.

To facilitate engagement of the loop 21 about the connector, this loop is shown as having a short length of webbing 26 secured about the same to serve as a handle for stretching and enlarging the loop when engaging it with or disengaging it from a cable connector.

The tiedown is quickly applied by engaging the elastic cord 21 about the connector 22 on the end of a cable and by buckling the straps about the body of the cable.

With the connector thus attached to the cable, it is only necessary to pull the hook 18 out and into engagement with one of the openings 27 provided in one of the end heads of the drum 28, FIG. 6.

In effecting this engagement with the drum the loop 17 is stretched and put under sufficient tension to hold the cable firmly and positively in place on the drum.

The second form of the invention shown in FIGS. 7 to 12, differs from the first in the form of cable holding clamp.

As shown in these views this holder is for a smaller size cable 29 and is accordingly made up of companion wedge members 30, 31 between which the cable is clamped, the first of these members being of reverse U-shaped cross section with transverse teeth or corrugations 32 in the top of the same and tracks 33 in the sides of the same inclined toward the top and the second member being a wedge shaped channel having correspondingly inclined lower edges 34 riding said inclined tracks and having a gripping or clamping top surface 35 opposed and substantially parallel to the corrugated top wall of the first member.

A wire loop 36 secured at 37 to the wedge member 31 is fastened to the doubled length of webbing 38 by passing one end of the webbing at 39 through the loop and securing it in that relation at 40, FIGS. 7 and 8.

The same end loops and connector loops may be used in this form of the invention as indicated by duplicate reference numerals.

This form of the invention, for smaller diameter cable may be applied to the cable and be fastened down on the drum as described for the first form.

FIGS. 7 and 8 show how a safety chain or wire 41 may be connected between the outer clamp member 30 and the wire loop 36 to prevent these members becoming separated when loosed from the cable.

The fastener in both forms can be quickly applied to the cable and connected with the drum in cable tensioning relation, and this without adding objectionably to the bulk of the cable or drum. Applied as described, the tiedown will hold the cable tight on the drum for all usual servicing requirements. These connectors are of simple sturdy construction and can be produced at low cost.

What is claimed is:

1. Tiedown for cable on a drum comprising
    a length of flexible webbing having an adjustable cable engaging clamp at one end and having a loop of elastic cord carrying an anchor hook at the opposite end, said length of flexible webbing being doubled on itself into a loop enclosing said loop of elastic cord, the doubled portions of the webbing being secured together in flat engagement and said adjustable cable engaging clamp including transversely disposed straps secured between said layers of the webbing and provided with end fasteners by which they may be adjustably secured about the cable and said length of flexible webbing be thereby secured in coextensive engagement on the end portion of said cable.

2. A tiedown for the end of cable on a drum comprising
a length of flexible webbing, an adjustable cable gripping clamp at one end of said webbing,
a loop of elastic cord with an anchor hook at the opposite end of said webbing and
a transversely disposed cable encircling loop of elastic cord on the intermediate portion of said webbing between said opposite ends said cable encircling loop having a loop extending handle attached thereto and by which said loop can be stretched to extend about the end of the cable held in the cable gripping clamp.

3. Tiedown for cable on a drum comprising
a length of flexible webbing having an adjustable cable engaging clamp at one end and having a loop of elastic cord carrying an anchor hook at the opposite end,
said length of webbing having a metal strap embedded therein and said cable clamp including cable encircling straps crossing said webbing and in tensioning engagement with said metal strap, said length of webbing comprising two layers of webbing material secured together over said metal strap and said cable encircling straps being secured in transverse relation between said webbing layers.

References Cited in the file of this patent

UNITED STATES PATENTS

| | | |
|---|---|---|
| 1,672,214 | Hayden | June 5, 1928 |
| 2,440,853 | Follick | May 4, 1948 |
| 2,449,882 | Daniels | Sept. 21, 1948 |

FOREIGN PATENTS

| | | |
|---|---|---|
| 970,141 | France | June 7, 1950 |